United States Patent
Shan (10) Patent No.: US 9,618,944 B2
(45) Date of Patent: Apr. 11, 2017

(54) PRESSURE CONTROLLER SYSTEM VALVE CHARACTERIZATION

(71) Applicant: General Electric Company, Schenectady, NY (US)

(72) Inventor: Qing Shan, Loughborough (GB)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 14/686,344

(22) Filed: Apr. 14, 2015

(65) Prior Publication Data

US 2016/0306370 A1   Oct. 20, 2016

(51) Int. Cl.
   *G05D 16/20* (2006.01)

(52) U.S. Cl.
   CPC ......... *G05D 16/2053* (2013.01); *G05D 16/20* (2013.01); *G05D 16/2046* (2013.01)

(58) Field of Classification Search
   CPC . G05D 16/20; G05D 16/2046; G05D 16/2053
   USPC .......................... 137/102, 596, 596.17, 487.5
   See application file for complete search history.

(56) References Cited

U.S. PATENT DOCUMENTS

| | | | |
|---|---|---|---|
| 2,731,023 A | 1/1956 | Panich et al. | |
| 3,554,223 A | 1/1971 | Shea | |
| 4,698,998 A | 10/1987 | Varnagy | |
| 5,142,483 A * | 8/1992 | Basham | G05D 16/2053 700/281 |
| 5,396,923 A * | 3/1995 | Allen | F16L 55/045 137/487.5 |
| 6,895,798 B2 | 5/2005 | Sosnowski | |
| 2003/0131792 A1* | 7/2003 | Park | H01L 21/67253 118/712 |
| 2004/0025941 A1* | 2/2004 | Wuerth | B60T 8/326 137/487.5 |
| 2006/0163277 A1* | 7/2006 | Vidal | B67D 7/0272 222/55 |
| 2013/0146148 A1* | 6/2013 | Smirnov | F17D 1/16 137/13 |

FOREIGN PATENT DOCUMENTS

EP   1469220   10/2004

* cited by examiner

*Primary Examiner* — Kevin Murphy
*Assistant Examiner* — Paul J Gray
(74) *Attorney, Agent, or Firm* — Barclay Damon, LLP (57) ABSTRACT

A method and system for characterizing pressure controller valves of a pressure controller system are described herein. The pressure controller system includes a first valve and a second valve coupled to a manifold and a controller configured to control operation of the first valve and the second valve. The first valve regulates mass flowrate into the manifold and the second valve regulates mass flowrate released from the manifold. To characterize the apply valve, an electronic solenoid current to the first valve is increased until the manifold pressure rate exceeds the pressure rate threshold. When the manifold pressure rate exceeds the pressure rate threshold, the electronic solenoid current to the first valve decreases until the manifold pressure rate falls below the pressure rate threshold. These steps continue until the manifold pressure exceeds a manifold pressure threshold. At this point, the first valve is closed and characterization of the second valve commences.

17 Claims, 6 Drawing Sheets

PRESSURE CONTROLLER SYSTEM VALVE CHARACTERIZATION

BACKGROUND OF THE INVENTION

The subject matter disclosed herein relates to pressure controller system valves and particularly to characterizing pressure controller system valves.

Pressure controller systems are devices for manipulating the pressure of gases. These devices can be used in a variety of fields, such as aeronautics, industrial, scientific, manufacturing, and automobile environments. For example, pressure controller systems are used in air data test sets (ADTS), compressor control and monitoring, automotive engine development, turbine monitoring and control, and flight tests, among others.

A pressure controller system includes an apply valve and a release valve. The pressure controller system can control pressure by driving the valve plungers up and down using electronic solenoid currents. If the pressure in the controller manifold is greater than a set-point, the controller closes the apply valve an amount and opens the release valve an amount, so that the mass flowrate of the gas flowing into the manifold is less than that out of the manifold. The pressure thus decreases towards the set-point. If the pressure in the manifold is less than the set-point, the controller opens the apply valve an amount and closes the release valve an amount, increasing the manifold pressure towards the set-point. The electronic solenoid current which drives the apply valve and the release valve is a function of pressure, mass flowrate, and temperature, and the process of knowing this relationship is called valve characterization.

Controller apply and release valves are the only dynamic components of the pressure controller system. The remaining controller components are static components. Thus, valve characterization is important to the accuracy and precision of a pressure controller system. Typically, a valve is characterized by static, point-to-point of pressure measurements. Because a small internal volume of a manifold can be quickly filled by a gas, even by a small mass flowrate, an external auxiliary pneumatic tank is employed to test the entire range of solenoid current, mass flowrate and pressure ranges, point by point.

This traditional valve characterization method is slow, taking at least forty minutes for a single process of typically sixteen points, if the process is successful. If the process fails, the process is repeated a second or third time. If the process still fails, the valve pair is discarded, a new pair of valves is installed, and the characterization process begins again. Thus, traditional valve characterization is a lengthy process, even with a successful pass on the first attempt. In addition, customers do not have the facility to perform tradition characterization. Rather, traditional characterization is performed in a factory for a new instrument or when a valve requires replacement after service. In addition, traditional characterization is unsuitable for low temperatures. At low temperatures, a valve plunger freezes and sticks to its seat. Because of this sticking, a large solenoid current is required to lift the plunger from its seat at low temperature. Once the plunger is lifted, the plunger jumps too much, leading to a pressure glitch. Because of this limitation, traditional valve characterization is not suitable for use in low temperature environments, thus limiting potential environment applications of pressure valve characterization.

The discussion above is merely provided for general background information and is not intended to be used as an aid in determining the scope of the claimed subject matter.

BRIEF DESCRIPTION OF THE INVENTION

A method and system for characterizing the pressure controller valves of a pressure controller system is described herein. The pressure controller system includes a first valve and a second valve coupled to a manifold and a controller configured to control operation of the first valve and the second valve. The first valve regulates mass flowrate into the manifold and the second valve regulates mass flowrate released from the manifold. To characterize the apply valve, an electronic solenoid current to the first valve is increased until the manifold pressure rate exceeds the pressure rate threshold. When the manifold pressure rate exceeds the pressure rate threshold, the electronic solenoid current to the first valve decreases until the manifold pressure rate falls below the pressure rate threshold. These steps continue until the manifold pressure exceeds a manifold pressure threshold. At this point, the first valve is closed and characterization of the second valve commences.

In an embodiment, a pressure controller system includes a first valve and a second valve coupled to a manifold and a controller configured to control operation of the first valve and the second valve. The first valve regulates mass flowrate into the manifold and the second valve regulates mass flowrate released from the manifold. A method for characterizing the first pressure controller valve and the second pressure controller valve of the pressure controller system includes (a) increasing, via the controller, an electronic solenoid current to the first valve and, (b) if a manifold pressure exceeds a manifold pressure threshold, the controller closing the first valve. The method additionally includes, (c) if a manifold pressure rate is less than a pressure rate threshold, the controller repeating step (a) and (b). Further, (d) if the manifold pressure rate exceeds the pressure rate threshold, decreasing the electronic solenoid current to the first valve using the controller. Additionally, the method includes (e) if the manifold pressure exceeds the manifold pressure threshold, the controller closing the first valve and (f) if the manifold pressure rate exceeds the pressure rate threshold, the controller repeating steps (d) and (e). Further, the method includes the controller (g) repeating steps (a)-(f) until the manifold pressure exceeds the manifold pressure threshold.

In another embodiment, a pressure controller system includes a manifold, a first pressure controller valve coupled to the manifold, and a second pressure controller valve coupled to the manifold. The first valve is configured to regulate mass flowrate into the manifold and the second valve is configured to regulate mass flowrate released from the manifold. The pressure controller system also includes a controller configured to control operation of the first valve and the second valve. The controller is configured to (a) increase an electronic solenoid current to the first valve and (b) if a manifold pressure exceeds a manifold pressure threshold, close the first valve. The controller is also configured to (c) if a manifold pressure rate is less than a pressure rate threshold, repeat steps (a) and (b) and (d) if the manifold pressure rate exceeds the pressure rate threshold, decrease the electronic solenoid current to the first valve. (e) If the manifold pressure exceeds the manifold pressure threshold, the controller is configured to close the first valve and (f) if the manifold pressure rate exceeds the pressure rate threshold, the controller is configured to repeat steps (d) and (e). The controller is configured to repeat steps (a)-(f) until the manifold pressure exceeds the manifold pressure threshold.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

DETAILED DESCRIPTION OF THE INVENTION

Figure 1:
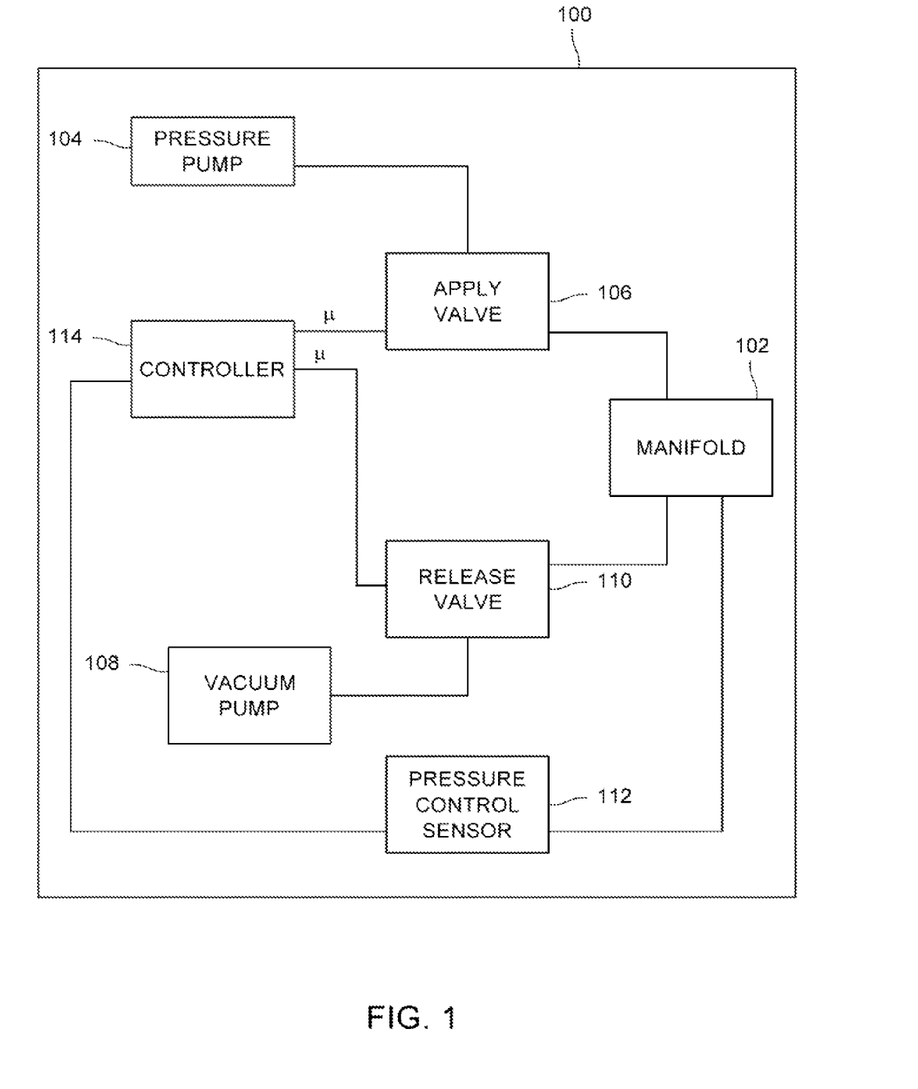
FIG. 1 is a block diagram of an exemplary pressure controller system.

FIG. 1 is a block diagram of an exemplary pressure controller system 100. The pressure controller system 100 includes a pressure pump 104 coupled to a manifold 102 via a first (apply) valve 106. A vacuum pump 108 is coupled to the manifold 102 via a second (release) valve 110. A pressure control sensor 112 is coupled to the manifold 102 to measure the manifold pressure.

The pressure controller system adjusts the manifold pressure by adjusting the first valve 106 and the second valve 110. The pressure controller system 100 adjusts the pressure in a manifold relative to a set-point. The pressure controller system 100 includes a controller 114, such as a proportional integral derivative (PID) controller, coupled to the first valve 106 and the second valve 110, controls opening and closing of the first 106 and second 110 valves. The pressure sensor 112, such as a resonant pressure transducer (RPT) sensor, measures the manifold pressure. The controller 114 analyzes the pressure of the manifold 102 and determines if the pressure of the manifold 102 matches the set-point. If the pressure of the manifold 102 does not match the set-point, the controller 114 adjusts the pressure of the manifold 102. In order to adjust the pressure of the manifold 102, the controller 114 gathers data. This data includes the pressure of the pressure pump, the pressure of the vacuum pump, and u (the amount a valve is opened or closed during an adjustment). The u corrects for mass flowrate ($\dot{m}$) so that changes the manifold pressure.

For example, if the manifold pressure is greater than a set-point, the first valve 106 is closed a predetermined amount u and the second valve 110 is opened a predetermined amount u. In another example, if the manifold pressure is less than a set-point, the apply valve 106 is opened a predetermined amount u and the release valve 110 is closed a predetermined amount u. Opening the apply valve 106 increases the manifold pressure while opening the release valve 110 decreases the manifold pressure.

The first valve 106 and the second valve 110 are each driven by an electronic solenoid current. This solenoid current is a function of the pressure difference between the valve's upstream and downstream pressures, flowrate, and temperature. By determining this relationship between pressure and flowrate, the valves 106 and 110 are characterized. Based on this valve characterization, the first valve 106 and the second valve 110 can be adjusted during operation to maintain the set-point.

It will be understood that, while certain components have been shown as a single component (e.g., controller 114) in FIG. 1, multiple separate components can be used to perform the functions of the single component (e.g., the controller 114).

Figure 2:
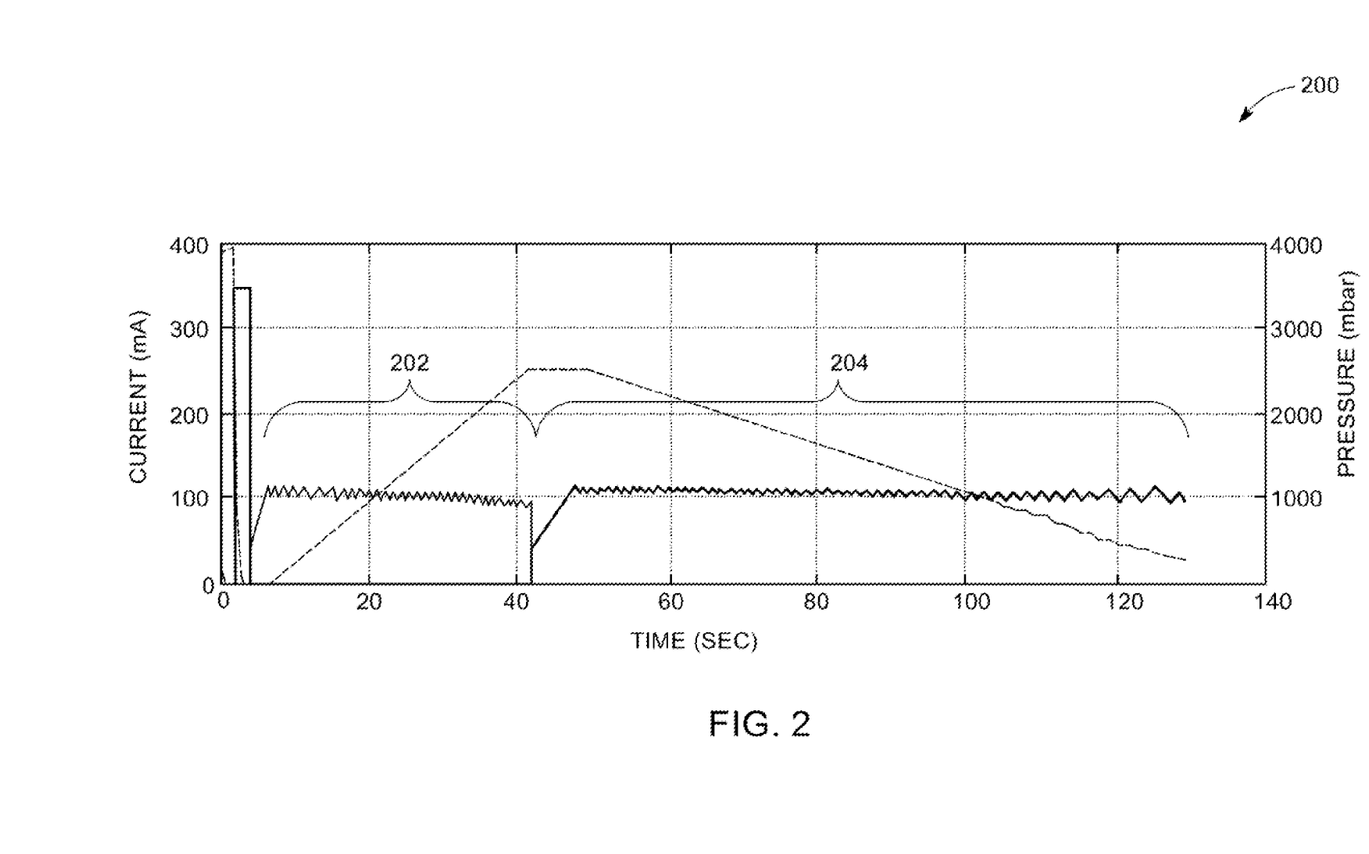
FIG. 2 is a graph of data collected during an exemplary valve characterization.

FIG. 2 is a graph 200 of data collected during an exemplary valve characterization. The method in which this data was collected will be described further with regard to the flowchart of FIG. 3. The graph 200 illustrates the solenoid current used to adjust a valve and the pressure measured within the manifold. Based on the measured pressure, the pressure rate can be determined. In this example, the data was gathered at 20 degrees Celsius. Section 202 of the graph represents data for the first (apply) valve and section 204 of the graph represents data for the second (release) valve.

Figure 3A:
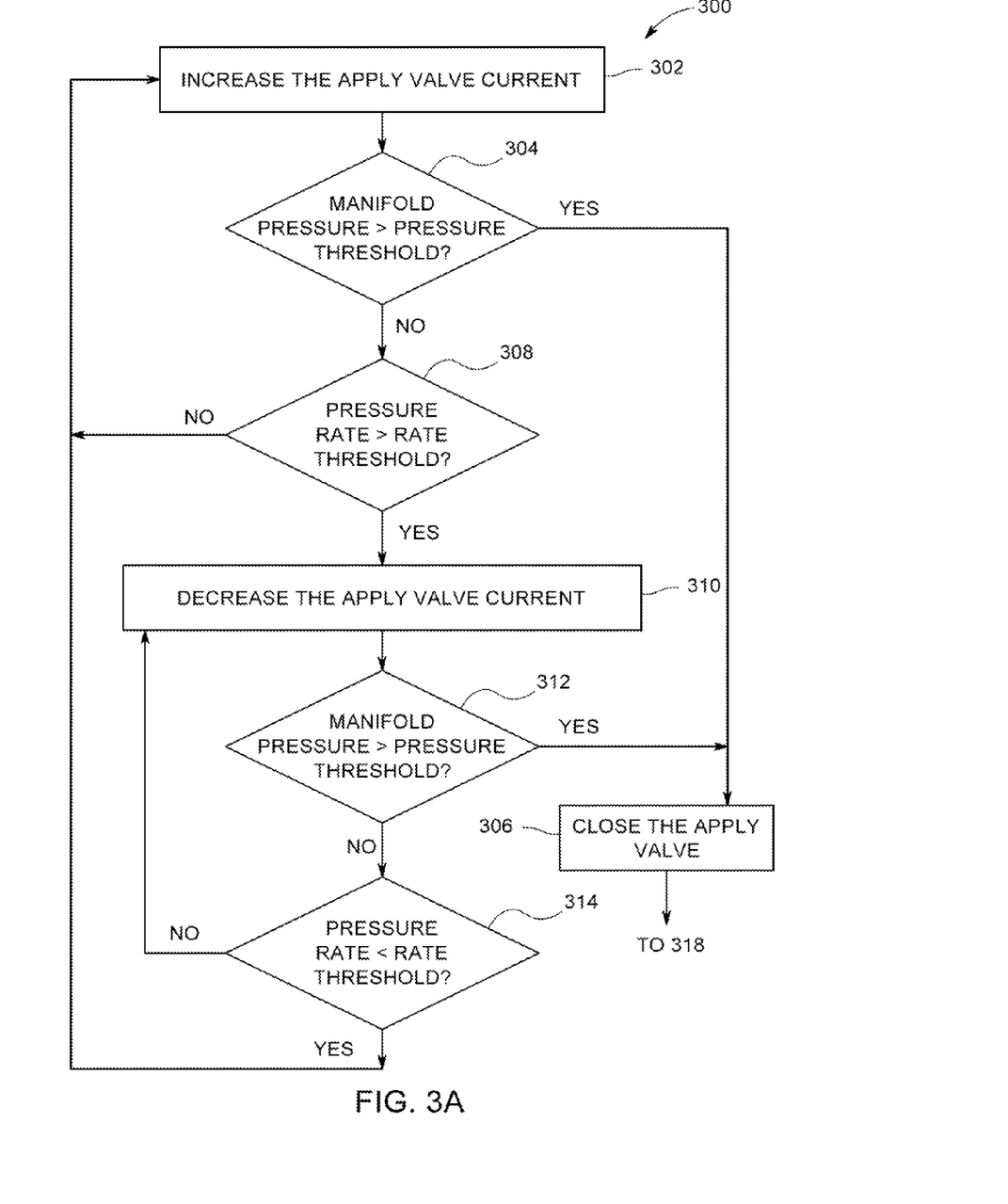
FIG. 3A is a flowchart for an exemplary method of valve characterization of a first (apply) pressure controller system valve.

FIG. 3A is a flowchart for an exemplary method 300 of valve characterization of a first (apply) pressure controller valve. The method 300 can be carried out in a controller 114, such as a PID controller, of a pressure controller system 100, such as the pressure controller system 100 described above with regard to FIG. 1. The method 300 can be initiated automatically or the method 300 can be initiated manually by an instrument operator. Before initiating the method 300, the controller 114 closes the apply valve 106 and the release valve 110 of the pressure controller system 100. The apply valve 106 and the release valve 110 are operated by their electronic solenoid currents. Valves are closed if their solenoid currents are 0 mA. To open the valves, the controller 114 increases the solenoid current to the valves. At block 302, the solenoid current to the apply valve 106 is increased, while the release valve 110 is closed. At block 306, the apply valve 106 is closed and the release valve 110 is opened gradually by increasing its solenoid current a small amount at a time. In this way, each valve is characterized individually. Thus, as illustrated by the graph of FIG. 2, a first section of data 202 represents the apply valve 106 solenoid current, and resulting pressure changes, applied to the apply valve 106 and a second section of data 204 represents the release valve solenoid current, and resulting pressure changes, applied to the release valve 110.

At block 304, the controller 114 determines if the manifold pressure has exceeded a predetermined manifold pressure threshold. If the manifold pressure is above the manifold pressure threshold, at block 306 the solenoid current to the apply valve 106 ceases, closing the apply valve 106 and characterization of the release valve 110 can begin, as described below with regard to FIG. 3B.

If the manifold pressure is not above the manifold pressure threshold, at block 308, the controller 114 determines if the manifold pressure rate has exceeded a predetermined rate threshold. The predetermined rate threshold can be based on the type of valve. For example, the rate threshold can be 5 mbar per minute. If the pressure rate threshold has not been exceeded, the method returns to block 302 and the solenoid current for the apply valve 106 is increased. If the pressure rate threshold has been exceeded, at block 310 the solenoid current for the apply valve 106 is decreased.

At block 312, the controller 114 determines if the manifold pressure has exceeded the predetermined manifold pressure threshold. If the manifold pressure is above the manifold pressure threshold, at block 306 the solenoid current to the apply valve 106 ceases, closing the apply valve 106. If the manifold pressure has not exceeded the manifold pressure threshold, at block 314, the controller 114 determines if the pressure rate is below the pressure rate threshold. If the pressure rate is not below the pressure rate threshold, the method 300 can return to block 310. If the pressure rate is below the pressure rate threshold, the method 300 can return to block 302. The method 300 can continue until the manifold pressure exceeds the manifold pressure threshold.

Figure 3B:
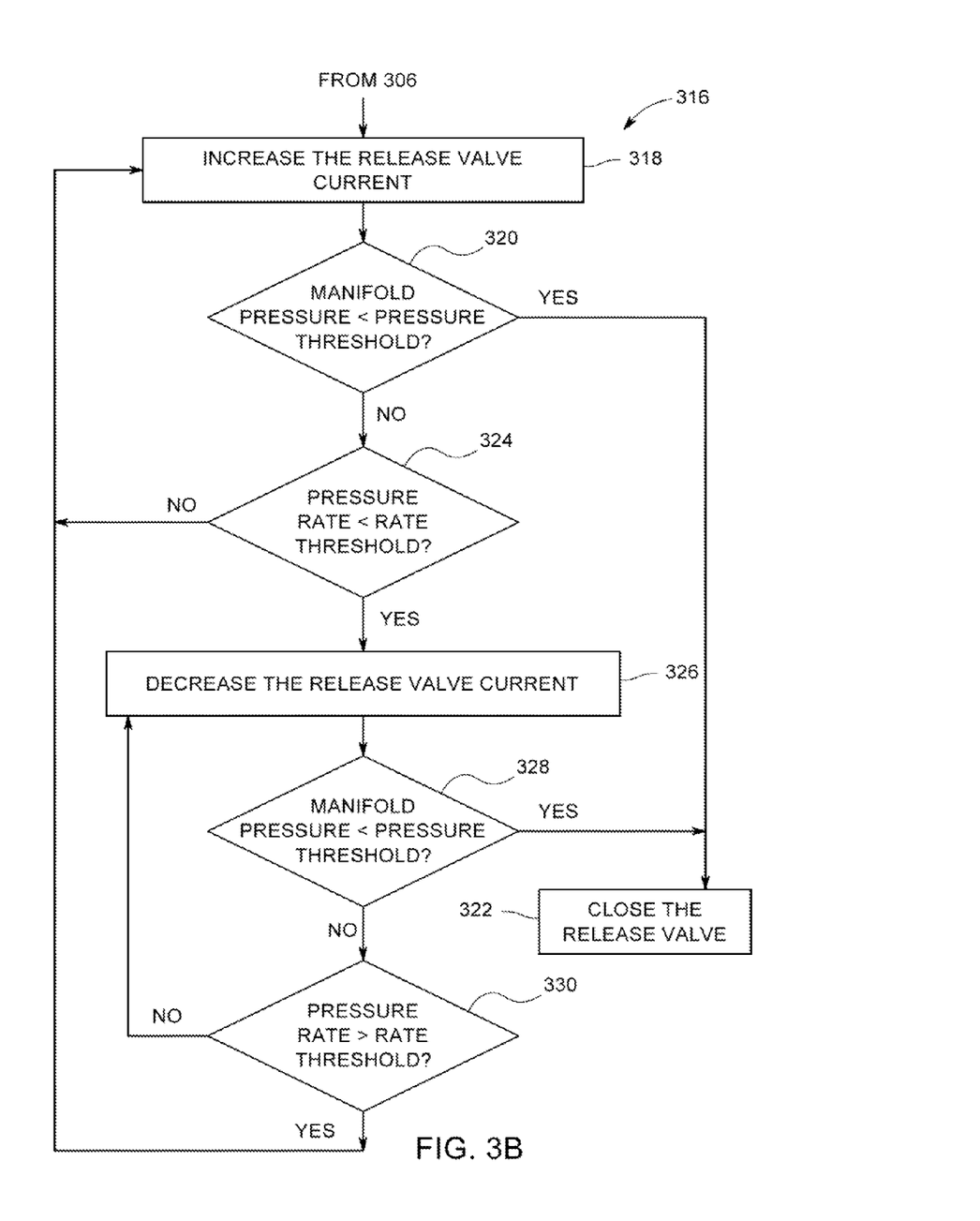
FIG. 3B is a flowchart for an exemplary method of valve characterization of a second (release) pressure controller system valve.

FIG. 3B is a flowchart for an exemplary method 316 of valve characterization of a second (release) pressure controller system valve. As with the method 300 described above with regard to the apply valve 106, both the apply valve 106 and the release valve 110 are closed prior to initiation of the method 316, as described by block 306. At block 318, the solenoid current to the release valve 110 increases. At block 320, the controller 114 determines if the manifold pressure is below a predetermined manifold pressure threshold. If the manifold pressure is below the manifold pressure threshold, at block 322 the solenoid current to the release valve 110 ceases, closing the release valve 110.

If the manifold pressure is not below the manifold pressure threshold, at block 324, the controller 114 determines if the manifold pressure rate is below the pressure rate threshold. If the pressure rate is not below the pressure rate threshold, the method 316 can return to block 318 and the release valve 110 current is increased. If the pressure rate is below the pressure rate threshold, at block 326 the release valve 110 solenoid current is decreased.

At block 328, the controller 114 determines if the manifold pressure is below the predetermined manifold pressure threshold. If the manifold pressure is below the manifold pressure threshold, at block 322 the solenoid current to the release valve 110 ceases, closing the release valve 110. If the manifold pressure is not below the manifold pressure threshold, the controller 114 determines if the pressure rate is above the pressure rate threshold. If the rate is not above the rate threshold, the method 316 can return to block 326. If the pressure rate is above the pressure rate threshold, the method 316 can return to block 318. The method 316 can continue until the manifold pressure is below the manifold pressure threshold. When the manifold pressure drops below the manifold pressure threshold, at block 322 the release valve 110 solenoid current ceases, closing the release valve 110. As illustrated by the graph 200 of FIG. 2, the entire characterization process (of the apply valve 106 and the release valve 110) can be completed in a short period of time, such as 120 seconds for a 40-point characterization. Additionally, the characterization methods 300, 316 described above are temperature independent and do not require external, auxiliary pneumatic equipment. Thus, the methods 300, 316 can be used in a field setting. The data collected can be analyzed by the controller 114 to determine a characterization for the apply valve 106 and a characterization for the release valve 110. This analysis will be further described with regard to FIGS. 4 and 5.

Figure 4:
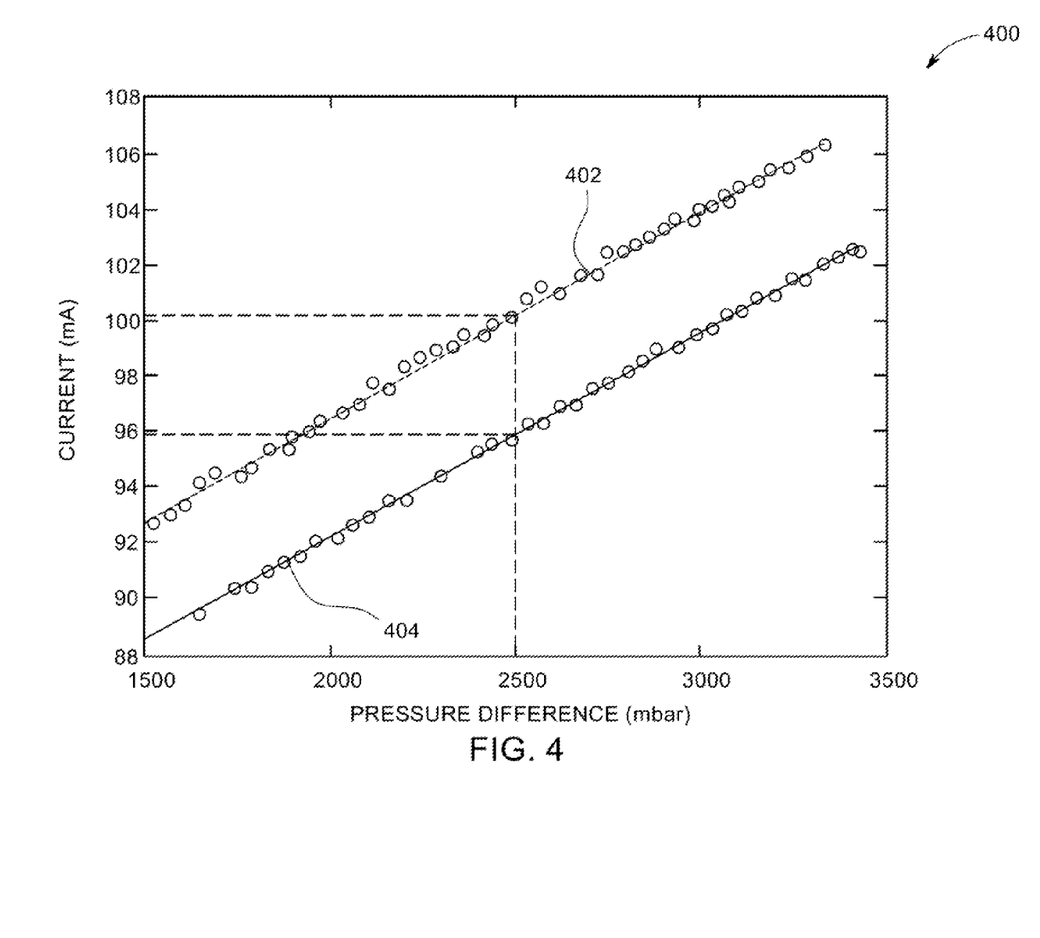
FIG. 4 is a graph illustrating an exemplary apply valve characterization.

FIG. 4 is a graph illustrating an exemplary apply valve 106 characterization. The graph 400 of the apply valve 106 characterization can be generated based on the data collected during valve characterization, such as in the method described with regard to FIG. 3A. The data gathered for the apply valve 106 is analyzed to isolate the pressure and electronic solenoid current data from time and to determine a one-to-one relationship between electronic solenoid current and pressure difference. A linear curve fit is used to determine this relationship. As illustrated by the graph 400, the apply valve 106 characterization includes two curves. The first curve 402 represents the solenoid current needed to open the apply valve 106 at a particular pressure difference and the second curve 404 represents the solenoid current needed to close the apply valve 106 an amount at a particular pressure difference. In order to determine the pressure difference of the apply valve 106, the pressure of the manifold is subtracted from the pressure of the pressure pump.

Based on this apply valve 106 characterization, a controller 114 can adjust an apply valve 106 position in order to adjust the manifold pressure. For example, at a pressure of 2500 mbar, a current of 100 mA is needed to open the apply valve 106 a predetermined amount. If a current less than 100 mA is applied, the apply valve 106 will not open. After a current of 100 mA is applied and the apply valve 106 has opened, reducing the apply valve 106 current to 98 mA will not change the position of the apply valve 106. The position of the apply valve 106 will not change until the current is reduced to 96 mA, at which point the apply valve 106 will begin to close. The controller 114 can add a delta to the solenoid current indicated in the apply valve 106 characterization in order to determine how much solenoid current is needed to move the apply valve 106. This delta is called the hysteresis characterization of the apply valve 106.

Figure 5:
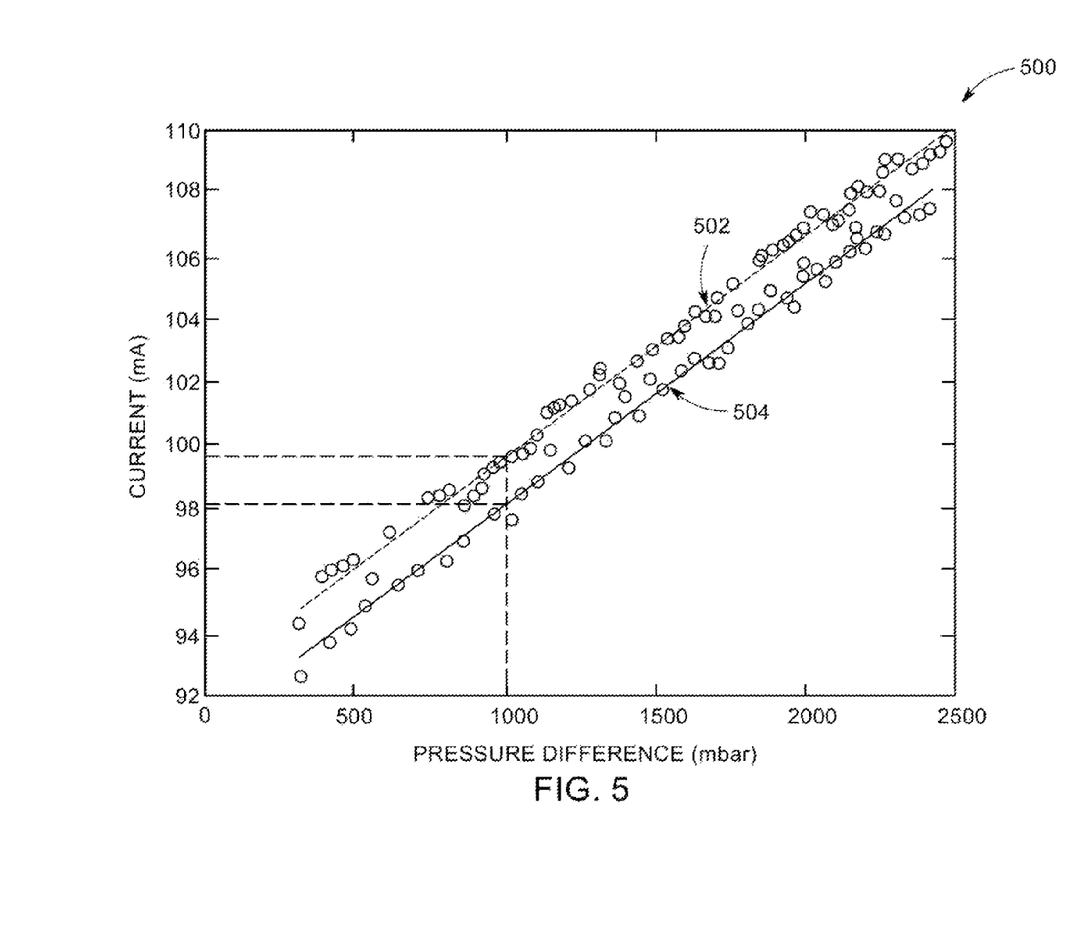
FIG. 5 is a graph illustrating an exemplary release valve characterization.

FIG. 5 is a graph illustrating an exemplary release valve 110 characterization. The graph 500 of the release valve 110 characterization can be generated based on the data collected during valve characterization, such as in the method described with regard to FIG. 3B. The data gathered for the release valve 110 is analyzed to isolate the pressure and solenoid current data from time and to determine a one-to-one relationship between solenoid current and pressure difference. A linear curve fit is used to determine this one-to-one relationship. As illustrated by the graph 500, the release valve 110 characterization includes two curves. The first curve 502 represents the solenoid current needed to open the release valve 110 at a particular pressure difference and the second curve 504 represents the solenoid current needed to close the release valve 110 a predetermined amount at a particular pressure difference. The pressure difference of the release valve 110 is determined by subtracting the pressure of the vacuum pump from the manifold pressure.

Based on this release valve 110 characterization, a controller 114 can adjust a release valve 110 position in order to adjust the manifold pressure. For example, at a pressure of 1000 mbar, a current of 99 mA is needed to open the release valve 110 an amount. If a current less than 99 mA is applied, the release valve 110 will not open. After a current of 99 mA is applied and the release valve 110 has opened, reducing the release valve 110 current to 98.5 mA will not change the position of the release valve 110. The position of the release valve 110 will not change until the current is reduced to 98 mA, at which point the release valve 110 will begin to close. The controller 114 can add a delta to the solenoid current indicated in the release valve 110 characterization in order to determine how much solenoid current is needed to move the release valve 110. This delta is called the hysteresis characterization of the release valve 110.

In view of the foregoing, embodiments of the invention perform pressure controller valve characterization. A technical effect is to reduce the time required to perform the valve characterization and to provide a temperature independent valve characterization.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," "instrument," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, an embedded computer in an instrument, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for characterizing a first pressure controller valve and a second controller valve of a pressure controller system, the pressure controller system comprising the first valve and the second valve coupled to a manifold and a controller configured to control operation of the first valve and the second valve, the first valve for regulating mass flowrate into the manifold and the second valve for regulating mass flowrate released from the manifold, the method comprising:
(a) increasing, via the controller, an electronic solenoid current to the first valve;
(b) if a manifold pressure exceeds a manifold pressure threshold, the controller closing the first valve;
(c) if a manifold pressure rate is less than a pressure rate threshold, the controller repeating steps (a) and (b);
(d) if the manifold pressure rate exceeds the pressure rate threshold, the controller decreasing the electronic solenoid current to the first valve;
(e) if the manifold pressure exceeds the manifold pressure threshold, the controller closing the first valve;
(f) if the manifold pressure rate exceeds the pressure rate threshold, the controller repeating steps (d) and (e); and
(g) the controller repeating steps (a)-(f) until the manifold pressure exceeds the manifold pressure threshold.

2. The method of claim 1, further comprising:
(h) increasing an electronic solenoid current to the second valve using the controller;
(i) if the manifold pressure is less than the manifold pressure threshold, the controller closing the release valve;
(j) if the manifold pressure rate is greater than the pressure rate threshold, the controller repeating steps (h)-(i);
(k) if the manifold pressure rate is less than the pressure rate threshold, the controller decreasing the electronic solenoid current to the second valve;
(l) if the manifold pressure is less than the manifold pressure threshold, the controller closing the second valve;
(m) if the manifold pressure rate is less than the pressure rate threshold, the controller repeating steps (k) and (l); and
(n) repeating steps (h)-(m) until the manifold pressure is less than the manifold pressure threshold using the controller.

3. The method of claim 2, further comprising analyzing changes in the electronic solenoid current to the first valve, the electronic solenoid current to the second valve, and manifold pressure to determine a first valve characterization and a second valve characterization using the controller.

4. The method of claim 3, further comprising adjusting the first valve and the second valve based on the first valve characterization and the second valve characterization to maintain a set-point manifold pressure using the controller.

5. The method of claim 4, wherein each of the first valve characterization and the second valve characterization comprises two linear curves, a first linear curve describing the electronic solenoid current to open one of the first valve and the second valve at a particular pressure difference between a pressure pump and manifold and a second linear curve describing the electronic solenoid current to close one of the first valve and the second valve at a particular pressure difference between the manifold and a vacuum pump.

6. The method of claim 3, wherein analyzing the changes in the electronic solenoid currents and pressure differences comprises:
determining the changes in the electronic solenoid current to the first valve, the electronic solenoid current to the second valve, and the manifold pressure;
determining a linear relationship between electronic solenoid current and pressure difference.

7. The method of claim 6, further comprising the controller using a curve fit to determine the linear relationship between electronic solenoid current and pressure difference.

8. The method of claim 1, wherein the first valve and the second valve are closed before the method begins.

9. The method of claim 1, wherein each of the first valve and the second valve are individually characterized.

10. The method of claim 1, further comprising manually invoking the method from an instrument menu.

11. The method of claim 1, further comprising completing characterization of the first valve and the second valve in a production setting.

12. A pressure controller system, comprising:
a manifold;
a first pressure controller valve coupled to the manifold, the first valve configured to regulate mass flowrate into the manifold;
and a second controller valve coupled to the manifold, the second valve configured to regulate mass flowrate released from the manifold; and
a controller configured to control operation of the first valve and the second valve, the controller configured to:
(a) increase an electronic solenoid current to the first valve;
(b) if a manifold pressure exceeds a manifold pressure threshold, close the first valve;
(c) if a manifold pressure rate is less than a pressure rate threshold, repeat steps (a) and (b);
(d) if the manifold pressure rate exceeds the pressure rate threshold, decrease the electronic solenoid current to the first valve;
(e) if the manifold pressure exceeds the manifold pressure threshold, close the first valve;
(f) if the manifold pressure rate exceeds the pressure rate threshold, repeat steps (d) and (e); and
(g) repeat steps (a)-(f) until the manifold pressure exceeds the manifold pressure threshold.

13. The pressure controller system of claim 12, the controller further configured to:
(h) increase an electronic solenoid current to the second valve;
(i) if the manifold pressure is less than the manifold pressure threshold, close the release valve;
(j) if the manifold pressure rate is greater than the pressure rate threshold, repeat steps (h)-(i);
(k) if the manifold pressure rate is less than the pressure rate threshold, decrease the electronic solenoid current to the second valve;
(l) if the manifold pressure is less than the manifold pressure threshold, close the second valve;
(m) if the manifold pressure rate is less than the pressure rate threshold, repeat steps (k) and (l); and
(n) repeat steps (h)-(m) until the manifold pressure is less than the manifold pressure threshold.

14. The pressure controller system of claim 13, the controller configured to analyze changes in the electronic solenoid current to the first valve, the electronic solenoid current to the second valve, and manifold pressure to determine a first valve characterization and a second valve characterization.

15. The pressure controller system of claim 14, the controller configured to adjust the first valve and the second valve based on the first valve characterization and the second valve characterization to maintain a set-point manifold pressure.

16. The pressure controller system of claim 15, wherein each of the first valve characterization and the second valve characterization comprises two linear curves, a first linear curve describing the electronic solenoid current to open a valve at a particular pressure difference between a pressure pump and manifold and a second linear curve describing the electronic solenoid current to close a valve at a particular pressure difference between the manifold and a vacuum pump.

17. The pressure controller system of claim 14, wherein analyzing the changes in the electronic solenoid currents and pressure differences comprises:
- the controller determining the changes in the electronic solenoid current to the first valve, the electronic solenoid current to the second valve, and the manifold pressure; and
- the controller determining a linear relationship between electronic solenoid current and pressure difference.

* * * * *